US008832210B2

(12) United States Patent
Muszynski et al.

(10) Patent No.: US 8,832,210 B2
(45) Date of Patent: Sep. 9, 2014

(54) ONLINE MONITORING FOR CUSTOMER SERVICE

(75) Inventors: Stephane Muszynski, Washington, DC (US); James Rainville, Mount Shasta, CA (US)

(73) Assignee: Oracle International Corporation, Redwood Shores, CA (US)

( * ) Notice: Subject to any disclaimer, the term of this patent is extended or adjusted under 35 U.S.C. 154(b) by 99 days.

(21) Appl. No.: 13/220,970

(22) Filed: Aug. 30, 2011

(65) Prior Publication Data

US 2013/0054707 A1    Feb. 28, 2013

(51) Int. Cl.
*G06F 15/16* (2006.01)
*G06Q 30/00* (2012.01)

(52) U.S. Cl.
CPC ................................. *G06Q 30/01* (2013.01)
USPC ........................................ 709/206; 709/207

(58) Field of Classification Search
USPC ......................................................... 709/206
See application file for complete search history.

(56) References Cited

U.S. PATENT DOCUMENTS

| | | | | |
|---|---|---|---|---|
| 6,230,197 B1 * | 5/2001 | Beck et al. | .................... | 709/223 |
| 6,611,498 B1 * | 8/2003 | Baker et al. | .................... | 370/252 |
| 6,931,119 B2 * | 8/2005 | Michelson et al. | ....... | 379/265.13 |
| 6,956,845 B2 * | 10/2005 | Baker et al. | .................... | 370/352 |
| 6,973,478 B1 * | 12/2005 | Ketonen et al. | .............. | 709/203 |
| 7,225,232 B2 * | 5/2007 | Elberse | ......................... | 709/206 |
| 7,236,486 B2 * | 6/2007 | Baker et al. | .................... | 370/352 |
| 7,266,537 B2 * | 9/2007 | Jacobsen et al. | ................ | 706/62 |
| 7,403,763 B2 * | 7/2008 | Maes | ........................... | 455/406 |
| 7,426,381 B2 * | 9/2008 | Maes | ........................... | 455/405 |
| 7,444,588 B2 * | 10/2008 | Hill et al. | ....................... | 715/255 |
| 7,676,034 B1 * | 3/2010 | Wu et al. | ................... | 379/265.01 |
| 7,720,690 B2 * | 5/2010 | Patrick et al. | ................... | 705/1.1 |
| 7,761,321 B2 * | 7/2010 | Kannan et al. | ............... | 705/7.13 |
| 7,805,382 B2 * | 9/2010 | Rosen et al. | .................. | 705/321 |
| 7,805,706 B1 * | 9/2010 | Ly et al. | ........................ | 717/121 |
| 7,835,931 B2 * | 11/2010 | Bayne | ........................... | 705/7.38 |
| 7,869,788 B2 * | 1/2011 | Maes | ........................... | 455/406 |
| 7,996,251 B2 * | 8/2011 | Kannan et al. | ............... | 705/7.13 |

(Continued)

FOREIGN PATENT DOCUMENTS

EP          1586060 A2 * 10/2005    ............. G06F 17/60

OTHER PUBLICATIONS

Buzzient Enterprise, http://www.buzzient.com/index.php/the-product, (last visited on Aug. 25, 2011), pp. 1-3.

(Continued)

*Primary Examiner* — Douglas W Owens
*Assistant Examiner* — Monica C King
(74) *Attorney, Agent, or Firm* — Miles & Stockbridge P.C.

(57) ABSTRACT

A system can monitor online services based on conditions that can be selected by an administrator. The system can identify and select messages from within the online services. The system can then transform the selected messages into a specific format and forward the transformed messages to an agent console application. The agent console application can be located, for example, at a call center. Within the agent console application, an agent can respond to the forwarded messages using a single unified interface that an agent uses to respond to a chat session request, or telephone call, for customer service. Thus, the specific communication details of the online services can be abstracted by the system, so that the agent can respond to the forwarded messages of different online services using the single unified interface.

22 Claims, 9 Drawing Sheets

(56) References Cited

U.S. PATENT DOCUMENTS

| | | | |
|---|---|---|---|
| 8,111,811 B2* | 2/2012 | Chilton et al. | 379/9.04 |
| 8,166,162 B2* | 4/2012 | Triano et al. | 709/224 |
| 8,204,779 B1* | 6/2012 | Hughes et al. | 705/7.39 |
| 8,238,540 B1* | 8/2012 | Duva et al. | 379/265.01 |
| 8,259,924 B2* | 9/2012 | Korolev et al. | 379/265.05 |
| 8,260,253 B2* | 9/2012 | Maes | 455/405 |
| 8,271,402 B2* | 9/2012 | Fisher, Jr. | 706/12 |
| 8,271,600 B2* | 9/2012 | Herold et al. | 709/206 |
| 8,279,779 B2* | 10/2012 | Singh et al. | 370/260 |
| 8,311,863 B1* | 11/2012 | Kemp | 705/7.11 |
| 8,315,184 B2* | 11/2012 | Sanchez | 370/252 |
| 8,325,893 B2* | 12/2012 | Vendrow | 379/189 |
| 2003/0097448 A1* | 5/2003 | Menezes et al. | 709/227 |
| 2007/0174407 A1* | 7/2007 | Chen et al. | 709/207 |
| 2007/0240214 A1* | 10/2007 | Berry | 726/22 |
| 2008/0045247 A1* | 2/2008 | Wilson | 455/466 |
| 2008/0209037 A1* | 8/2008 | Zernik et al. | 709/225 |
| 2008/0228894 A1* | 9/2008 | Chen et al. | 709/207 |
| 2008/0307220 A1* | 12/2008 | Campbell | 713/155 |
| 2009/0017794 A1* | 1/2009 | Wilson | 455/414.1 |
| 2009/0048940 A1* | 2/2009 | Hill et al. | 705/26 |
| 2009/0132632 A1* | 5/2009 | Jackson et al. | 709/201 |
| 2009/0164522 A1* | 6/2009 | Fahey | 707/104.1 |
| 2009/0182565 A1* | 7/2009 | Erickson et al. | 705/1 |
| 2009/0193028 A1* | 7/2009 | Kaplan | 707/10 |
| 2009/0198510 A1* | 8/2009 | Ditto | 705/2 |
| 2010/0070883 A1* | 3/2010 | Hamilton et al. | 715/757 |
| 2010/0131707 A1* | 5/2010 | Chi et al. | 711/115 |
| 2010/0158236 A1* | 6/2010 | Chang et al. | 379/265.03 |
| 2010/0198645 A1* | 8/2010 | Heiss et al. | 705/9 |
| 2010/0205103 A1* | 8/2010 | Patrick et al. | 705/304 |
| 2010/0246800 A1* | 9/2010 | Geppert et al. | 379/265.09 |
| 2010/0322391 A1* | 12/2010 | Michaelis et al. | 379/45 |
| 2011/0078584 A1* | 3/2011 | Winterstein et al. | 715/751 |
| 2011/0110364 A1* | 5/2011 | Fried et al. | 370/352 |
| 2011/0125826 A1* | 5/2011 | Erhart et al. | 709/202 |
| 2011/0202455 A1* | 8/2011 | Vasten et al. | 705/39 |
| 2011/0208822 A1* | 8/2011 | Rathod | 709/206 |
| 2011/0246260 A1* | 10/2011 | Gilbert et al. | 705/7.32 |
| 2011/0276396 A1* | 11/2011 | Rathod | 705/14.49 |
| 2011/0288897 A1* | 11/2011 | Erhart et al. | 705/7.13 |
| 2012/0072358 A1* | 3/2012 | Famous et al. | 705/319 |
| 2012/0110096 A1* | 5/2012 | Smarr et al. | 709/206 |
| 2012/0151046 A1* | 6/2012 | Weiss et al. | 709/224 |
| 2012/0151047 A1* | 6/2012 | Hodges et al. | 709/224 |
| 2012/0164991 A1* | 6/2012 | Zhu et al. | 455/414.1 |
| 2012/0195422 A1* | 8/2012 | Famous | 379/265.09 |
| 2012/0224020 A1* | 9/2012 | Portman et al. | 348/14.02 |
| 2012/0237016 A1* | 9/2012 | Hegde et al. | 379/265.01 |
| 2012/0245944 A1* | 9/2012 | Gruber et al. | 704/270.1 |
| 2012/0265695 A1* | 10/2012 | Tuchman et al. | 705/304 |
| 2012/0296790 A1* | 11/2012 | Robb | 705/35 |
| 2012/0310842 A1* | 12/2012 | Fisher, Jr. | 705/304 |
| 2012/0316861 A1* | 12/2012 | Custer et al. | 704/2 |
| 2012/0321071 A1* | 12/2012 | Fisher, Jr. | 379/265.09 |
| 2012/0323938 A1* | 12/2012 | Skeen et al. | 707/754 |
| 2012/0330869 A1* | 12/2012 | Durham | 706/16 |
| 2013/0007163 A1* | 1/2013 | O'Brien et al. | 709/206 |

OTHER PUBLICATIONS

Buzzient Enterprise: Key Features, http://www.buzzient.com/index.php/the-product/key-features, (last visited on Aug. 25, 2011), pp. 1-8.

Radian 6 Engagement Console, http://www.radian6.com/products/engagement/, (last visited on Aug. 25, 2011), pp. 1-3.

Live Help User Manual, https://help.instantservice.com/manuals/Agent_Console_User_Manual.pdf, (last visited on Aug. 25, 2011), 103 pgs.

Moxie Software Social Media, http://www.moxiesoft.com/tal_products/social-media.aspx, (last visited on Aug. 25, 2011), 1 page.

Moxie Software Social Media Solution Sheet, http://www.moxiesoft.com/uploadedfiles/ss_socialmedia.pdf, (last visited on Aug. 25, 2011), 2 pgs.

* cited by examiner

Fig. 4

List of defined Social Routing Rules

500

| ID# | Name | Group | Network | Department | Actions |
|---|---|---|---|---|---|
| 1 | Test Rule | PR | twitter | Sales | |
| 2 | Test Chained Rule | PR | facebook | Sales | |
| 11 | Good Things | | twitter | Sales | |
| 12 | No Operator Rule | Sales | facebook | Sales | |
| 13 | Malformed rule | | facebook | | |

Create Rule

Fig. 5

(12) United States Patent

ONLINE MONITORING FOR CUSTOMER SERVICE

FIELD

One embodiment is directed to a computer system, and more particularly, to a computer system that manages customer service.

BACKGROUND

Today, there are many online services, such as social networking services, that focus on building and reflecting social networks or social relations among people, where people may share interests and/or activities. In today's world of social networking, voluminous amounts of information are available on Internet web pages, electronic bulletin boards, and other electronic displays that are provided by these social networking services. This information can allow a company to build vast repositories of information. However, the transparency and openness of the social networking world also means that this information is available to everyone else, or to at least a large community, where the large community may include customers or potential customers of the company. This means that a derogatory message that is broadcast within a social networking service can potentially be very damaging to the company, as the derogatory message may be viewed by hundreds or thousands of individuals. Thus, companies can be required to dedicate significant manpower to query the various social networking services in order to capture and answer derogatory messages that are broadcast within the social networking services, in order to defuse these potential customer service nightmares.

SUMMARY

One embodiment is directed to a computer-readable medium having instructions stored thereon that, when executed by a processor, cause the processor to monitor, and respond to, one or more online service messages. The instructions include monitoring an online service based on a rule that comprises one or more conditions. The instructions further include selecting an online service message that has been broadcast within the online service that satisfies at least one condition of the rule. The instructions further include assigning the online service message to a logical grouping of one or more agents based on the rule. The instructions further include creating a chat session. The instructions further include transforming the online service message into a chat session message. The instructions further include transmitting the chat session message within the chat session to an agent console associated with the logical grouping of one or more agents.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4 illustrates a user interface of a rules engine that defines a condition for a rule, according to an embodiment of the invention.

FIG. 5 illustrates a user interface of a rules engine that displays a plurality of rules, according to an embodiment of the invention.

DETAILED DESCRIPTION

According to an embodiment, a system can monitor online services based on conditions that can be selected by an administrator. The system can identify and select messages from within the online services. The system can then transform the selected messages into a specific format and forward the transformed messages to an agent console application. The agent console application can be located, for example, at a call center. Within the agent console application, an agent can respond to the forwarded messages using a single unified interface that an agent uses to respond to a chat session request, or telephone call, for customer service. Thus, the specific communication details of the online services can be abstracted by the system, so that the agent can respond to the forwarded messages of different online services using the single unified interface. A response by the agent can take the form of a chat offer, a call offer, an email offer, or an offer for another type of resource. Furthermore, the system can monitor any type of online service. For example, the system can monitor a social networking service, such as Twitter®, Facebook®, and LinkedIn®. As additional examples, the system can monitor a text messaging service, such as Short Message Service ("SMS"), or an instant messaging service, such as America Online® Instant Messenger ("AIM").

Figure 1:
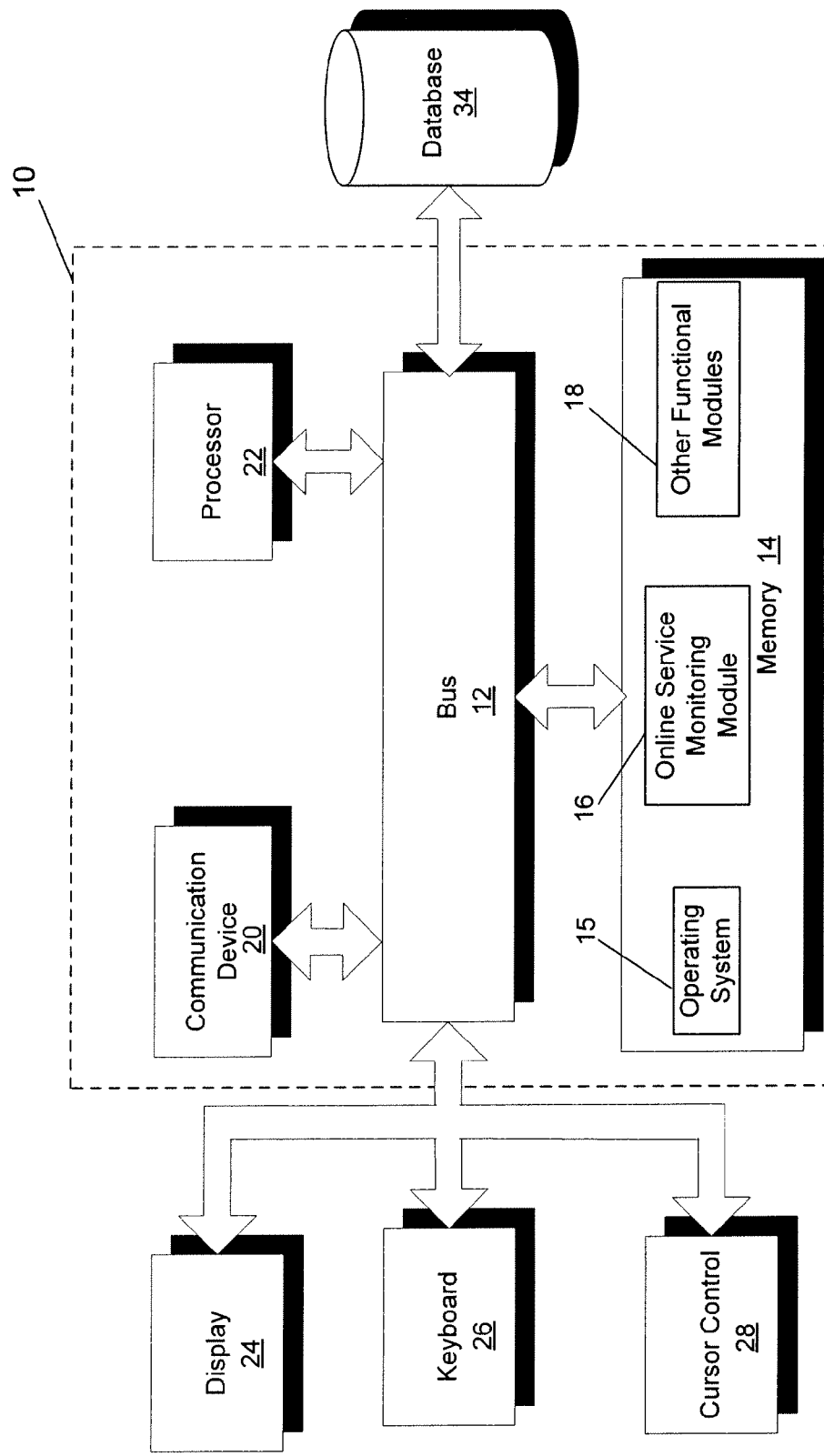
FIG. 1 illustrates a block diagram of a system that can implement an embodiment of the invention.

FIG. 1 illustrates a block diagram of a system 10 that can implement one embodiment of the invention. System 10 includes a bus 12 or other communication mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communication interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, an online service monitoring module 16, as well as other functional modules 18. Operating system 15 can provide an operating system functionality for system 10. Online service monitoring module 16 can provide functionality for monitoring, and responding to, one or more online service messages, as will be described in more detail below. System 10 can also be part of a larger system. Thus, system 10 can include one or more additional functional modules 18 to include the additional functionality. For example, functional modules 18 may include modules that are part of an "ATG Optimization" product from Oracle Corp.

In one embodiment, functional modules 18 include an agent console module. An agent console module can provide functionality for displaying the one or more online service messages within a user interface, and can also provide functionality for generating a response to the one or more online service messages, as will be described in more detail below. In alternate embodiments, functional modules 18 do not include an agent console module, and instead, the functionality of an agent console module can be provided by one or more additional systems that are operatively coupled to system 10. In one alternate embodiment, the functionality of an agent console module is provided by online service monitoring module 16, rather than a separate agent console module.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
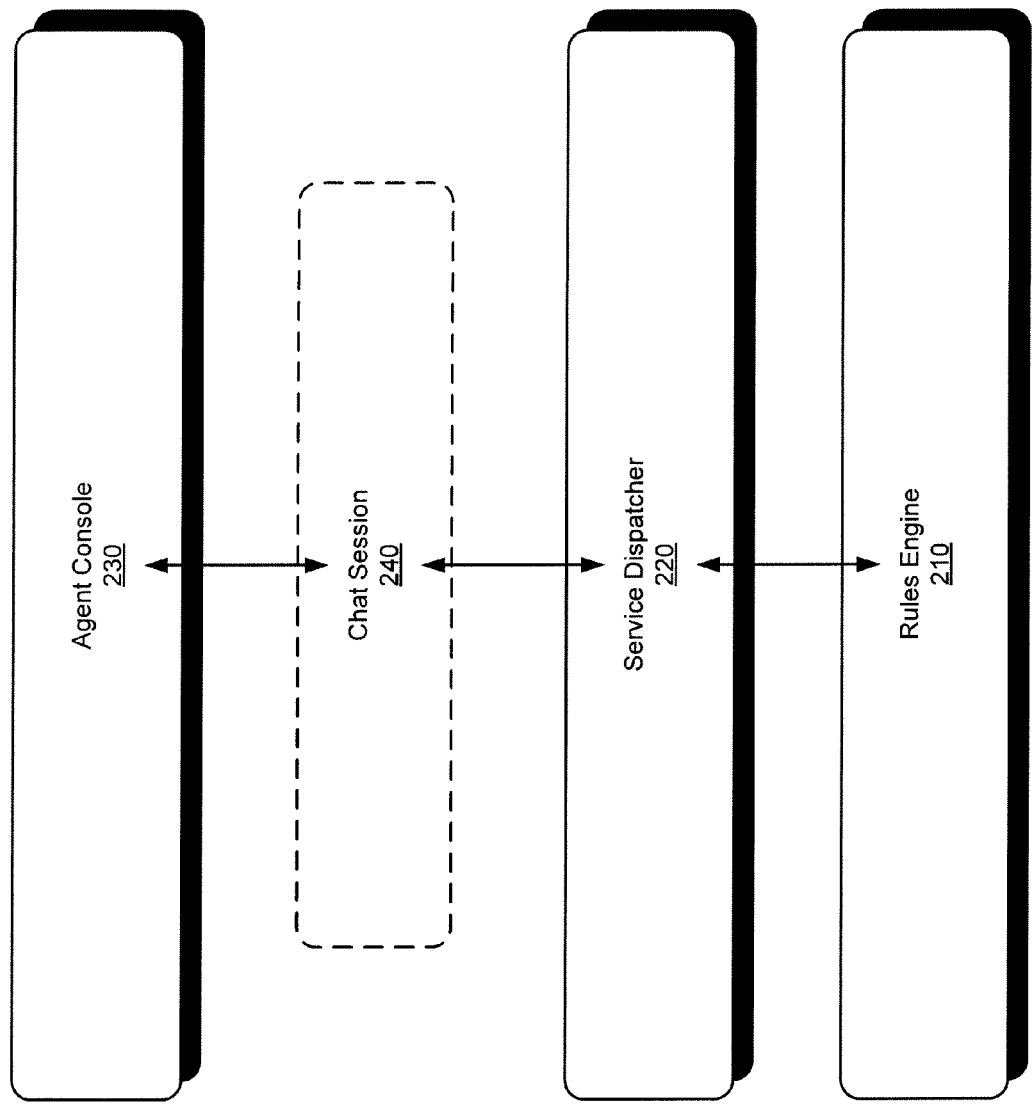
FIG. 2 illustrates a block diagram of high-level functional components of a system according to an embodiment of the invention.

FIG. 2 illustrates a block diagram of functional components of a system according to an embodiment of the invention. In one embodiment, the system is identical to system 10 illustrated in FIG. 1. According to the embodiment, the system can include the following functional components: rules engine 210, service dispatcher 220, agent console 230, and chat session 240. Rules engine 210 allows an administrator of the system to define one or more rules for monitoring online services, where each rule includes one or more conditions. Service dispatcher 220 performs the monitoring of the online services, and provides an interface between the online services and agent console 230, where service dispatcher 220 retrieves messages broadcast within the online services, and provides them to agent console 230 utilizing chat session 240. According to the embodiment, service dispatcher 220 can also receive messages created by agent console 230 utilizing chat session 240 and transmit them to users of the online services. Agent console 230 allows a user of the system to receive the messages broadcast within the online services that are retrieved by service dispatcher 220. In one embodiment, agent console 230 can perform this function by displaying the messages broadcast within the online services in a user interface. Agent console 230 also allows a user of the system to transmit response messages that can be broadcast within the online services by service dispatcher 220. In one embodiment, agent console 230 can perform this function by displaying chat session 240 within the user interface. Chat session 240 is a chat session that can be established by service dispatcher 220, based on a chat protocol, where chat session 240 can be utilized to transmit messages to and from agent console 230. The functionality of rules engine 210, service dispatcher 220, agent console 230, and chat session 240 are described below in greater detail.

In one embodiment, rules engine 210, service dispatcher 220, agent console 230, and chat session 240 are separate processes that interact with one another in order to provide the functionality described below in greater detail. Also, in one embodiment, the functionality of rules engine 210, service dispatcher 220, agent console 230, and chat session 240 can be provided by online service monitoring module 16 of FIG. 1, when executed by processor 22 of FIG. 1.

An example of a flow between the functional components illustrated in FIG. 2 will now be described. In the example, an administrator of the system utilizes rule engine 210 to create a rule for monitoring an online service. For example, the administrator accesses a user interface displayed by rules engine 210, and selects an online service, such as Twitter®, that the rule will apply to. As is further described in greater detail below, Twitter® is only an example of an online service, and a rule can be applied to many other types of online services. The user further defines a condition for the rule, such as entering one or more keywords (for example, "ATG," "Optimization" and "Rocks"). The user further defines the condition by selecting an operator to describe the relationship between the keywords (for example, selecting the "AND" operator). A keyword is only one type of condition, and a user can define many other types of conditions. The user then saves the rule using the user interface displayed by rules engine 210. The rule is subsequently published (i.e., enabled) by rules engine 210.

Upon saving the rule, according to the example, rules engine 210 transmits a provisioning message to service dispatcher 220 that includes data associated with the rule. Upon receiving the data within the provisioning message transmitted by rules engine 210, service dispatcher 220 creates a "line driver" process (or thread) that corresponds to an online service the rule was defined for. The line driver process monitors the online service for messages that satisfy the condition of the rule. Upon identifying a message that satisfies the condition of the rule, the line driver process selects the message and retrieves data from the message. When the line driver process receives data from the message that satisfies the condition of the rule, the line driver process transforms the message into a format appropriate for chat session 240, and service dispatcher 220 transmits the formatted message to agent console 230 using chat session 240, where chat session 240 is based on a chat protocol that itself is based on an application programming interface ("API").

According to the example, when chat session 240 is created for agent console 230, chat session 240 is associated with a particular user of agent console 230. For example, each user may be associated with a department, and, based on a department that is associated with the rule that created the message, chat session 240 is associated with a user that is also associated with the same department. Furthermore, when chat session 240 is created for a particular user of agent console 230, an integration panel is displayed within a user interface of agent console 230. This integration panel displays the formatted message that is transmitted by service dispatcher 220 to a user, where the formatted message includes message data.

In this integration panel, a user can enter data for a responding message, such as text. The integration panel can validate the responding message based on criteria of the online service (for example, validate that the length of the entered text does not exceed a predetermined length). Upon completion of the responding message, agent console 230 then places the responding message within chat session 240. Upon placing the responding message within chat session 240, agent console 230 then transmits the responding message to service dispatcher 220 utilizing chat session 240, which is based on the API.

Subsequently, service dispatcher 220 transmits the responding message to the corresponding line driver process for transmission to an author of the original message within the online service. The corresponding line driver process then transforms the responding message into a format appropriate for the online service, and transmits the formatted responding message to the author of the original message within the online service. Furthermore, using the integration panel of agent console 230, a user can also transmit to the author of the original message an offer to initiate a chat session, a telephone session, or other type of session. This offer can be a component of the responding message, or can be a component of a separate message.

As previously described, in one embodiment, a system can include a rules engine (such as rules engine 210 of FIG. 2). A rules engine provides functionality that allows an administrator of the system to define one or more rules for monitoring online services, where each rule includes one or more conditions. The rules can then be used to select one or more messages that are broadcast within the online services. Specifics of a rule engine, and a rule for monitoring online services, are now described in greater detail.

Figure 3:
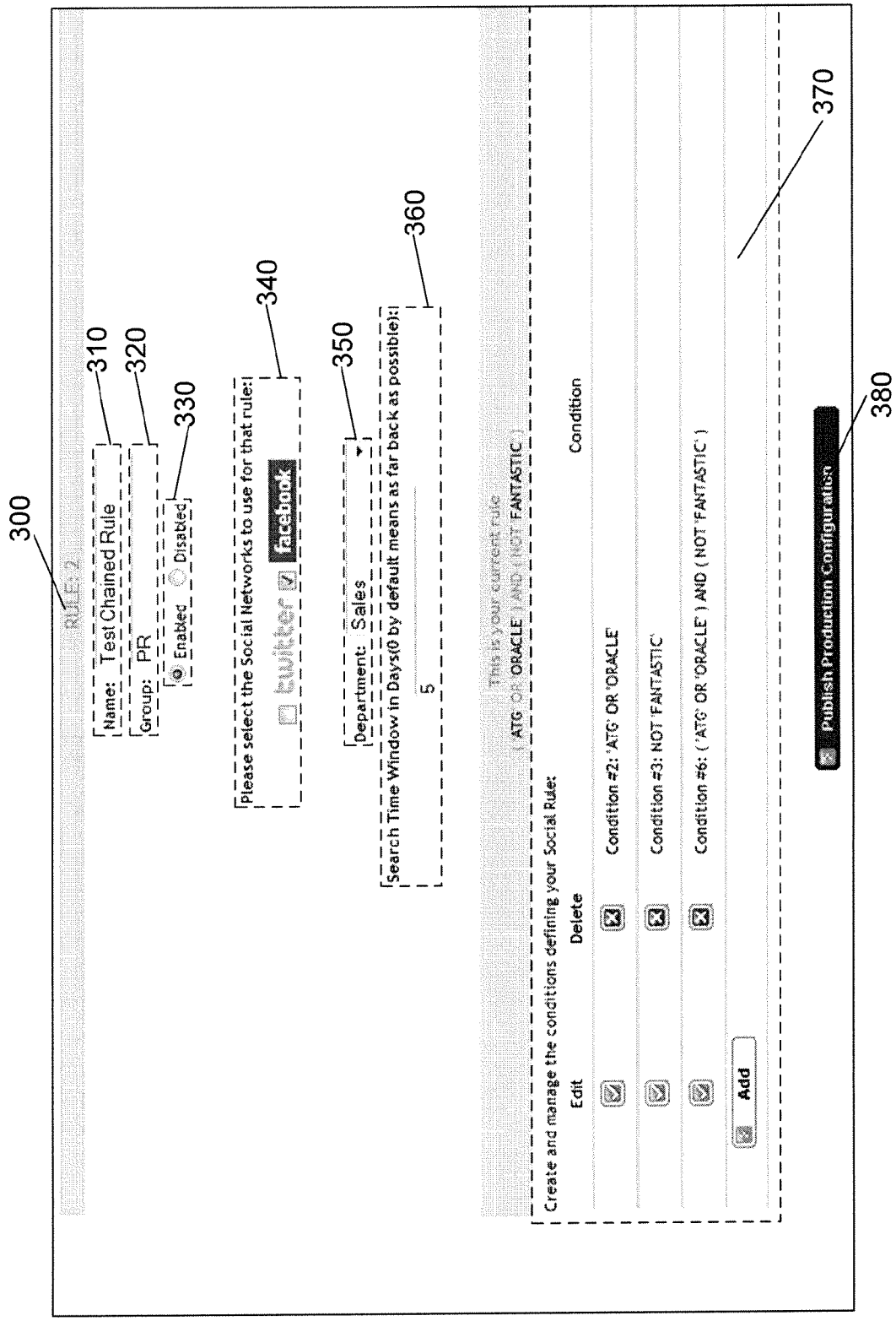
FIG. 3 illustrates a user interface of a rules engine that defines a rule for monitoring an online service, according to an embodiment of the invention.

FIG. 3 illustrates a user interface 300 of a rules engine that defines a rule for monitoring an online service, according to an embodiment of the invention. One of ordinary skill in the relevant art would appreciate that user interface 300 is merely an example user interface of a rules engine according to an embodiment, and that in alternate embodiments, a user interface of a rules engine may have a different appearance, but still be within the scope of the invention. According to an embodiment, a rule for monitoring an online service includes business logic that defines how the system monitors a specific online service. More specifically, the business logic defines which messages broadcast within the online service are to be identified and selected by the system.

In one embodiment, a rule includes one or more attributes. An attribute is data associated with the rule that defines a characteristic of the rule. Examples of attributes include a name attribute, a group attribute, an enabled attribute, an online service attribute, a department attribute, and a search time attribute. A name attribute defines a relevant name for the rule. The name for the rule can be displayed within user interface 300 illustrated in FIG. 3. A group attribute defines a group for the rule. The group can be used to facilitate sorting of one or more rules. An enabled attribute defines whether the rule is enabled or disabled (i.e., whether the rule is executed after it is defined). An online service attribute defines which online service the rule is to be applied to. In one embodiment, an online service can be a social networking service, such as Twitter®, Facebook®, and LinkedIn®. In an alternate embodiment, an online service can be a text messaging service, such as SMS. In yet another alternate embodiment, an online service can be an instant messaging service, such as AIM®. A department attribute defines a routing configuration for messages broadcast within the online service that are selected based on the rule. The routing configuration can be used to select an agent console. Once an agent console is selected, the selected messages broadcast within the online service can be routed to the selected agent console. For example, each user of an agent console can be associated with a department, and the department attribute defines which department that the messages broadcast within the online service should be routed to. A search time attribute defines how far back in time an online service should be monitored. A duration in time can be defined using a default period of time, such as days. For example, a search time attribute with a value of 5 indicates that an online service should be monitored for one or more messages that are broadcast within the last five days of the execution of the rule.

Furthermore, in one embodiment, a rule also includes one or more conditions. A condition is business logic associated with the rule that defines which messages broadcast within the online service are to be identified and selected. One example of a condition is a keyword condition. A keyword condition includes one or more keywords (e.g., "Oracle," and "Optimization") that can be used to identify and select one or more messages broadcast within the online service. In other words, messages broadcast within the online service that contain one or more of the keywords of the keyword condition can be identified and selected. A keyword condition can also include one or more logical operators (e.g., "AND", "OR", "NOT", and "NULL") that can be used to combine multiple keywords and modify single keywords. For example, the logical operator "AND" can be used so that only messages with all of the multiple keywords are identified and selected, the logical operator "OR" can be used so that messages with any of the multiple keywords are identified and selected, the logical operator "NOT" can be used so that messages that do not include the single keyword are identified and selected, and the logical operator "NULL" can be used to negate a condition based on a single or multiple keywords. Thus, an example keyword condition is ("ATG" OR "Commerce") AND (NOT "Platform") AND (NOT "Best") AND ("Suck").

Another example of a condition is a sentiment condition. A sentiment condition includes one or more sentiments (e.g. positive, negative, happy, sad, angry, etc.) that can be used to identify and select one or more messages broadcast within the online service. In other words, text contained within messages broadcast within an online service can be analyzed to determine if the text contains a sentiment that matches the one or more sentiments of the sentiment condition. A sentiment condition can also include one or more logical operators (e.g., AND, OR, NOT, and NULL) that can be used to combine multiple sentiments or modify single sentiments, as described above with respect to keywords. Furthermore, other types of conditions can be created for a rule, in addition to keyword conditions and sentiment conditions. For example, a condition can be created for a rule based on social status of an author of a message. For example, a condition can be created so that only messages where the message author has a certain number of followers is identified and selected.

According to an embodiment, user interface 300, illustrated in FIG. 3, allows an administrator of a system to define a rule. More specifically, user interface 300 allows an administrator to create a new rule, or modify an existing rule. By creating a rule, or modifying an existing rule, an administrator can define one or more attributes, and one or more conditions, for the rule, using user interface 300. In one embodiment, a rules engine uses a unified language to express the rule. Thus, an administrator does not need to know any specific implementation details of an online service in order to define a rule for the online service.

According to the embodiment, user interface 300 displays name attribute 310, group attribute 320, enabled attribute 330, online service attribute 340, department attribute 350, and search time attribute 360. Name attribute 310 allows an administrator to enter a value that identifies a name for the rule. Group attribute 320 allows an administrator to enter a value that identifies a group for the rule. Enabled attribute 330 allows a user to select a value that indicates whether the rule is enabled or disabled. Online service attribute 340 allows a user to select a value that indicates which online service the rule is to be applied to. Department attribute 350 allows a user to select a value that identifies a department that any messages identified and selected by the rule should be forwarded to. Search time attribute 360 allows a user to enter a value that indicates how far back in time an online service should be monitored. Furthermore, user interface 300 also displays condition window 370 which allows a user to define one or more conditions for the rule. Condition window 370 is described in greater detail in relation to FIG. 4. In addition, user interface 300 also displays publish button 380. By clicking on publish button 380, a user can publish (i.e., enable) the rule. Upon publishing of the rule, the system monitors the online service based on the service rule. The system continues to monitor the online service until the rule is unpublished (i.e., disabled). A system can have any number of published (i.e., enabled) rules at any time.

Figure 4:
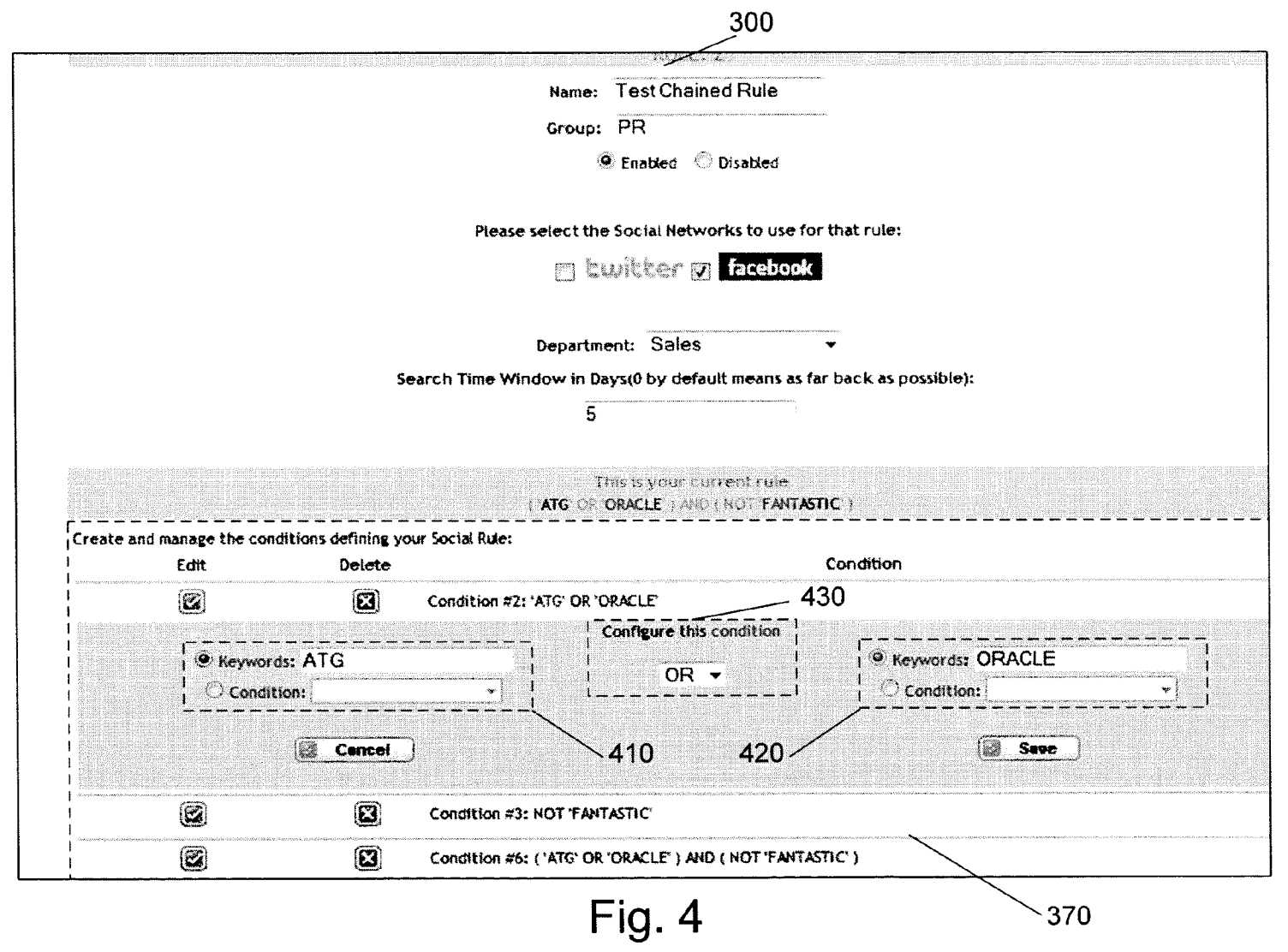

FIG. 4 illustrates user interface 300 of a rules engine that defines a condition for a rule, according to an embodiment of the invention. As previously described, user interface 300 includes condition window 370 which allows a user to define one or more conditions for a rule. In the illustrated embodiment, condition window 370 displays three conditions associated with the rule, entitled "Condition #2," "Condition #3," and "Condition #6." However, one of ordinary skill in the relevant art would appreciate that this is only an example, and that condition window 370 can display any number of conditions that are associated with the rule.

Furthermore, for the condition entitled "Condition #2," condition window 370 includes keyword/previous condition 410 and keyword/previous condition 420. Keyword/previous condition 410 and keyword/previous condition 420 each allow an administrator to either define a keyword, or reference a previously defined condition. While condition window 370 includes two keywords/previous conditions, as illustrated in FIG. 4, one of ordinary skill in the relevant art would readily appreciate that this is merely an example, and that condition window 370 can include any number of keywords/previous conditions. Furthermore, for the condition entitled "Condition #2," condition window 370 also includes logical operator 430. Logical operator 430 allows an administrator to define a logical operator that combines keyword/previous condition 410 and keyword/previous condition 420. As one of ordinary skill in the relevant art would readily appreciate, an administrator can make similar configurations for the other conditions associated with the rule.

While in the illustrated embodiment of FIG. 4, each condition displayed within condition window 370 includes one or more keywords, one of ordinary skill in the relevant art would appreciate that this is only an example embodiment implementing keyword conditions. In alternate embodiments, other types of conditions could be implemented. For example, in an embodiment implementing sentiment conditions, each condition displayed within condition window can include one or more sentiments, rather than keywords.

According to an embodiment, when a rule is defined for a rules engine by an administrator, a corresponding rule object is created that represents the rule, where an object is an entity created by a programming language that comprises one or more attributes and one or more methods, as understood by one of ordinary skill in the relevant art. The corresponding rule object is subsequently stored in a database of the system (such as database 34 of FIG. 1). Furthermore, according to the embodiment, when the rule is defined for the rules engine, and the corresponding rule object is stored in the database, a provisioning message is formed and transmitted to a service dispatcher of the system. Furthermore in one embodiment, when a rule is defined for a rules engine, the rule is validated. Examples of rule validation can include: (1) a rule only can only include one condition that is a parent condition (i.e., does not reference any previous conditions); (2) a rule cannot include a plurality of conditions, where the plurality of conditions reference each other in a loop format (e.g., condition 3=condition 1 and condition 2; condition 2=condition 3 or condition 4); (3) the "AND" and "OR" logical operators require two conditions; and (4) the "NOT" and "NULL" logical operators require one condition.

In one embodiment, when a rule is defined for a rules engine by an administrator, a corresponding rule object is created that represents the rule. The rule object is based on the following object model. A rule object is comprised of one or more attributes. In one example, a rule object comprises the following attributes: a rule identity; an online service account identity; a last retrieved message identity; an online service name; a rule name; a group name; a department name, and an enabled/disabled value. According to the example, a rule identity is an identity value for the rule object. An online service account identity is an identity value for an online service account object that corresponds to the rule object, where the online service account object defines one or more attributes that identify account information for an online service associated with the rule. An online service name is a value that identifies a name of the online service associated with the rule. A rule name is a value that identifies a name of the rule. A group name is a value that identifies a group associated with the rule. A department name is a value that identifies a name of the department associated with the rule. An enabled/disabled value is a value that identified whether the rule is enabled or disabled.

According to the embodiment, the rule object can be referenced by one or more condition objects, where a condition object represents a condition of the corresponding rule. A condition object is comprised of one or more attributes. In one example, a condition object comprises the following attributes: a condition identity; a rule identity; a parent condition identity; an operand; an operator; and a published value. According to the example, a condition identity is an identity value for the condition object. A rule identity is an identity value for a rule object that the condition object references. A parent condition identity is an identity value for a parent condition object that the condition object references, if any. An operand is a value that identifies one or more keywords, and/or one or more condition identities (in the case where the operand references one or more conditions). An operator is a value that identifies a logical operator for the condition. A published value is a value that identifies whether the referenced rule (and thus, the condition) has been published.

In accordance with the embodiment, the rule object can reference an online service account object, where an online service account object represents an account for an online service of the corresponding rule. An online service account object is comprised of one or more attributes. In one example, an online service account object comprises the following attributes: an online service account identity, an online service identity, a username, an API key, an application name, and an authentication identity. According to the example, an online service account identity is an identity value for the online service account object. An online service identity is an identity value for an online service object that corresponds to the online service account object, where the online service object defines one or more attributes that identify an online service associated with the rule. A user name is a value that identifies a user name associated with the online service account. An API key is a value that identifies an API secret key associated with the online service account. An application name is a value that identifies a name of an application associated with the online service account. An authorization identity is an identity value for an authorization object that corresponds to the online service account object, where the authorization object defines one or more attributes that identify an authorization protocol associated with the online service account, if any.

According to the embodiment, the online service account object can reference an online service object, where an online service object represents an online service of the corresponding rule. An online service object is comprised of one or more attributes. In one example, an online service object comprises the following attributes: an online service identity; an online service name; a logo; an online service uniform resource locator ("URL"); a character limit; and a user profile URL. An online service identity is an identity value for the online service object. An online service name is a value that identifies a name of the online service. A logo is a value that identifies a URL of a logo, where the logo can be displayed within a user interface to represent the online service. An online service URL is a value that identifies a URL of the online service. A character limit is a value that identifies a character limit associated with the online service. A user profile URL is a value that identifies a URL of a user profile that is associated with the online service.

In accordance with the embodiment, the online service account object can also reference an authorization object, where an authorization object represents an authorization protocol that can be utilized by the online service. An example of an authorization protocol is the Open Authorization ("OAuth") protocol. An authorization object is comprised of one or more attributes. In one example, an authorization object comprises the following attributes: an authorization identity; a consumer public key, a consumer secret, an online service key, and an online service secret. An authentication identity is an identity value for the authentication object. A consumer public key is a value that identifies a public key that is assigned to a consumer of an online service. A consumer secret is a value that identifies a secret that is assigned to the consumer of the online service. An online service key is a value that identifies a service key that is assigned by the online service. An online secret is a value that identifies a secret that is assigned by the online service.

A rule object, and any corresponding objects (such as a condition object, an online service account object, an online service object, an authorization object, or a combination therein), can be stored in a database of the system. In one example embodiment, the tables of the database are as follows:

| Database Table for Rule Object: Rule | | | | |
|---|---|---|---|---|
| Key | Name | Type | Size | Comment |
| YES | rid | BIGINT | | Rule identity |
| | uoid | BIGINT | | Online service account identity |
| | Since_id | BIGINT | | Message identity of last retrieved message |
| | Network | varchar | | Online service name |
| | Name | varchar | 20 | Rule name |
| | groupname | varchar | 20 | Group name |
| | department | int | | Department name |
| | Enabled | Boolean | | Rule enabled/disabled |

| Database Table for Condition Object: Condition | | | | |
|---|---|---|---|---|
| Key | Name | Type | Size | Comment |
| YES | cid | Double | | Condition identity |
| | rid | Double | | Rule identity |
| | Parent_cid | uInt | | Parent condition identity (value of 0 if root condition) |
| | operand | varchar | 255 | List of keywords or condition identities separated by '|' |
| | operator | varchar | 5 | "AND" or "OR" or "NOT" or "NULL" |
| | Published | Boolean | | True if rule has been published |

| Database Table for Online Service Account Object: OnlineServiceAccount | | | | |
|---|---|---|---|---|
| Key | Name | Type | Size | Comment |
| YES | uoid | BIGINT | | Online service account identity |
| YES | nid | INT | | Online service identity |
| | username | varchar | 20 | Username |
| | apiKey | varchar | 50 | API secret key |
| | appId | varchar | 20 | Application identity |
| | authId | INT | | Authentication identity |

| Database Table for Online Service Object: OnlineService | | | | |
|---|---|---|---|---|
| Key | Name | Type | Size | Comment |
| YES | Nid | INT | | Online service identity |
| | Name | Varchar | 15 | Online service name |
| | Logo | Varchar | 100 | Logo URL |
| | serviceUrl | Varchar | 100 | Online service URL |
| | charLimit | Int | 10 | Character limit for online service (value of 0 if no limit) |
| | UserProfileUrl | Varchar | 100 | Base URL to access a user profile for online service |

Database Table for Authorization Object: Authorization

| Key | Name            | Type    | Size | Comment                            |
|-----|-----------------|---------|------|------------------------------------|
| YES | authId          | BIGINT  |      | Authorization identity             |
|     | Consumer_key    | Varchar | 132  | Public consumer key                |
|     | Consumer_secret | Varchar | 132  | Secret assigned to consumer        |
|     | Access_key      | Varchar | 132  | Key assigned by online service     |
|     | Access_secret   | Varchar | 132  | Secret assigned by online service  |

FIG. 5 illustrates a user interface 500 of a rules engine that displays a plurality of rules, according to an embodiment of the invention. According to the embodiment, user interface 500 allows an administrator to visualize the rules that have been defined, identify which rules apply to which online service, and identify which rules are published. Furthermore, according to the embodiment, user interface 500 allows an administrator to create one or more rules, edit one or more rules, enable or disable one or more rules, copy one or more rules, or delete one or more rules.

In one embodiment, when an administrator creates a rule, a user interface is displayed that is similar to user interface 300 of FIG. 3. Furthermore, when an administrator edits a rule, a user interface that is similar to user interface 300 of FIG. 3 is also displayed, but user interface 300 is pre-populated with the attributes and the conditions defined for the rule. The user interface allows for the creating and modifying of the attributes and the conditions of the rule, as previously described. When a rule is created or modified, the rule is saved, a corresponding rule object is saved to a database, and a provisioning message is transmitted to a service dispatcher as previously described. When a condition is created or modified, the condition is saved, and a corresponding condition object is saved to the database, as previously described. In one embodiment, any condition that is saved is not published until the rule is also saved and published.

Furthermore, when a rule is enabled, a provisioning message that includes a start operation is transmitted to a service dispatcher. Likewise, when a rule is disabled, a provisioning message that includes a stop operation is transmitted to the service dispatcher. When a rule is copied, the existing rule, along with its one or more conditions, is duplicated, and the duplicate rule is disabled. Furthermore, when a rule is deleted, the rule, along with its one or more conditions, is erased, and a provisioning message that includes a stop operation is transmitted to the service dispatcher. Provisioning messages that can be transmitted to the service dispatcher by the rules engine are described below in greater detail.

In one embodiment, a system can include a service dispatcher (such as service dispatcher 220 of FIG. 2). The service dispatcher performs the monitoring of the online services based on one or more rules defined by a rules engine, and provides an interface between the online services and an agent console, where the service dispatcher retrieves messages broadcast within the online services, and provides them to the agent console utilizing a chat session that is based on a chat protocol. The service dispatcher can also receive messages created by the agent console utilizing the chat session and transmit them to users of the online services. Specifics of a service dispatcher are now described in greater detail.

According to an embodiment, when a service dispatcher is initiated, the service dispatcher can query a database of the system for all rules that have been defined by a rules engine. For example, the service dispatcher can query the Rule database table previously described and identify one or more rules stored within the Rule database table. For each rule that has been defined, the service dispatcher can monitor an online service based on the rule.

Furthermore, according to the embodiment, when a rules engine creates or modifies a rule after the service dispatcher has initiated, the rules engine transmits a provisioning message to the service dispatcher. In one embodiment, the provisioning message includes a start or stop operation that can be used to create or delete an instance of a line driver process associated with an online service. Furthermore, in one embodiment, the start or stop operation is an American Standard Code for Information Interchange ("ASCII") string, where the ASCII string can be used to create or delete an instance of a line driver process. A line driver process is described below in greater detail.

According to the embodiment, the service dispatcher can listen for a provisioning message on a port. As an example, a provisioning message may include an ASCII string using a format: <rid>|<operation>, where rid represents a rule identity for a rule that is being operated on, and operation represents either "START" or "STOP." For example, a provisioning message may include the string "12345|START," where 12345 is the rule identity, and START is the operation. When the service dispatcher receives the ASCII string, the service dispatcher can take appropriate action based on the operation in the ASCII string. This appropriate action can include creating an instance of a line driver process if the operation in the ASCII string is "START," or deleting an instance of a line driver process if the operation in the ASCII string is "STOP." A line driver process is described below in greater detail.

According to the embodiment, the service dispatcher can monitor an online service for one or more messages broadcast within the online service that satisfy the one or more conditions of the rule. When the service dispatcher identifies and selects a message broadcast within the online service, the service dispatcher can transform the message into a format appropriate for a chat session based on a chat protocol that itself is based on an API. The service dispatcher can then subsequently transmit the transformed message to an agent console using the chat session. Furthermore, the service dispatcher can receive a responding message from the agent console using the chat session. The service dispatcher can transform the responding message into a format appropriate for the online service, and can transmit the responding message within the online service. In one embodiment, the service dispatcher can transform the message into an XML format, where the XML format is used by a chat session. An example XML format is shown below:

```
<Message>
    <OnlineService></OnlineService>
    <ID></ID>
    <Length></Length>
    <Contributor></Contributor>
    <Subject></Subject>
    <Content></Content>
    <Tags></Tags>
</Message>
```

Figure 6:
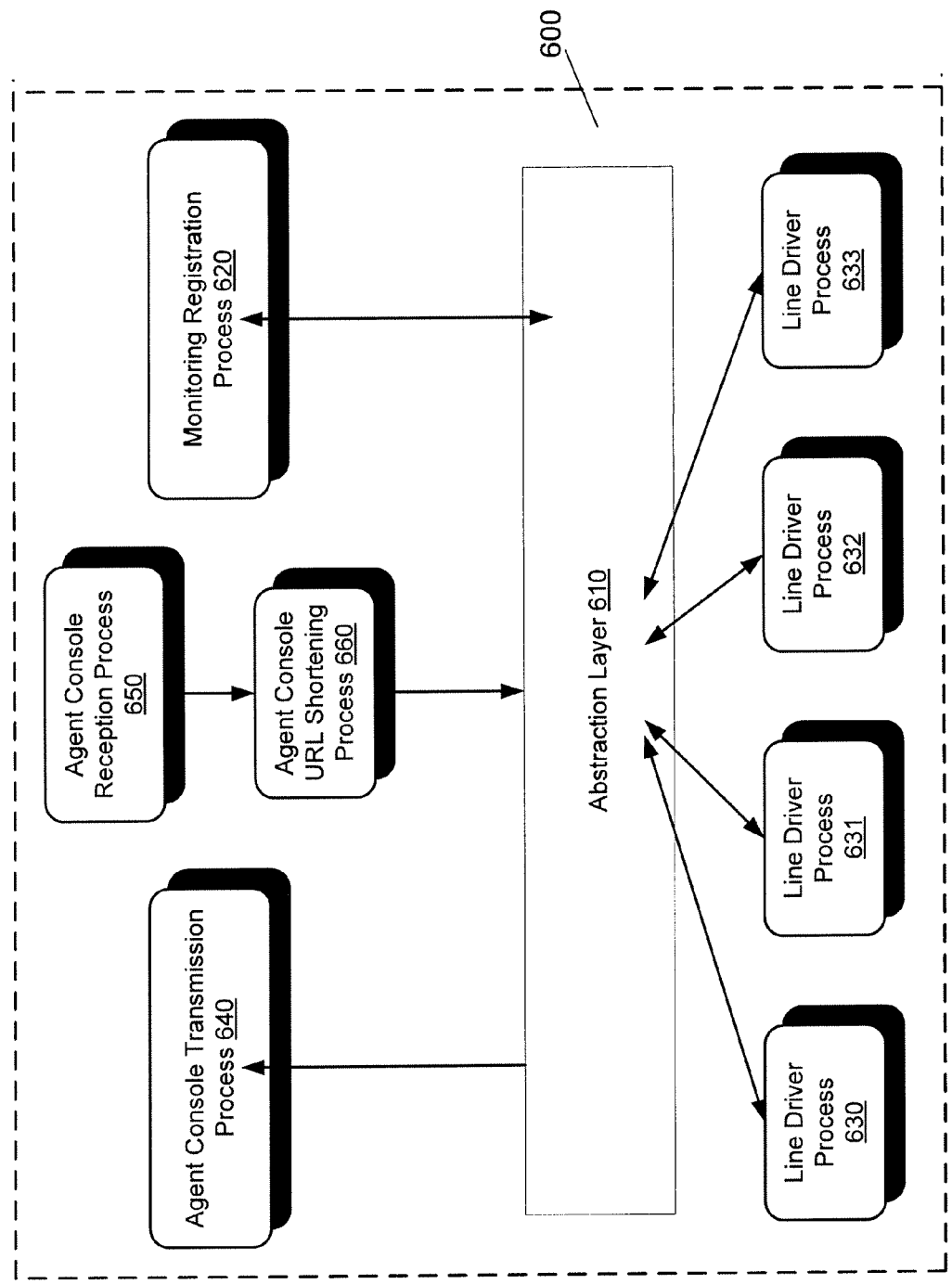
FIG. 6 illustrates a service dispatcher, according to an embodiment of the invention.

FIG. 6 illustrates a service dispatcher 600, according to an embodiment of the invention. In one embodiment, service dispatcher 600 is identical to service dispatcher 220 of FIG. 2. In the embodiment, service dispatcher 600 includes abstraction layer 610. Abstraction layer 610 is a process that abstracts the implementation details of one or more online services, so that functional components of a system, other than a service dispatcher (such as service dispatcher 600 illustrated in FIG. 6), do not have to know the implementation details of the one or more online services. In one embodiment, abstraction layer 610 includes program code written in a Python® programming language. However, this is only an example embodiment, and in other embodiments, abstraction layer 610 can include program code written in any language. As previously described, when a rule is created or modified by a rules engine, the rules engine sends a provisioning message to service dispatcher 600. Abstraction layer 610 receives the provisioning message and creates an instance of a line driver process based on the online service associated with the rule. Thus, abstraction layer 610 can create one or more line driver processes, and can further manage the one or more line driver processes.

In one embodiment, abstraction layer 610 includes a Send( ) interface that formats and sends a message to a specific online service, and a Crawler( ) interface that takes a rule as an input, builds one or more conditions for that rule, and initiates a monitoring of the online service based on the rule, and the one or more conditions, using a line driver process. According to the embodiment, the monitoring continues until the rule is deleted or disabled.

In the embodiment, abstraction layer 610 creates and manages one or more processes to perform various functionality. Such processes are now described in greater detail.

According to the embodiment, abstraction layer 610 creates and manages one or more monitoring registration processes. In the illustrated embodiment of FIG. 6, the one or more monitoring registration processes are represented by monitoring registration process 620. However, one of ordinary skill in the relevant art would readily appreciate that the number of monitoring registration processes illustrated in FIG. 6 is merely an example number of monitoring registration processes, and that abstraction layer 610 can create and manage any number of monitoring registration processes.

In one embodiment, monitoring registration process 620 queries a database of the system for all rules that have been defined by a rules engine. For example, monitoring registration process 620 can query the Rule database table previously described and identify one or more rules stored within the Rule database table. For each rule that has been defined, monitoring registration process 620 causes abstraction layer 610 to create an instance of a line driver process. The instance of the line driver process then monitors an online service based on the rule.

Furthermore, according to the embodiment, when a rules engine creates or modifies a rule after monitoring registration process 620 has been created, monitoring registration process 620 listens for a provisioning message on a port. As previously described, in an example, a provisioning message may include an ASCII string using a format: <rid>|<operation>, where rid represents a rule identity for a rule that is being operated on, and operation represents either "START" or "STOP." When monitoring registration process 620 receives the ASCII string, monitoring registration process 620 causes abstraction layer 610 to take appropriate action based on the operation in the ASCII string. This appropriate action can include creating an instance of a line driver process if the operation in the ASCII string is "START," or deleting an instance of a line driver process if the operation in the ASCII string is "STOP."

Abstraction layer 610 also creates and manages one or more line driver processes. In the illustrated embodiment of FIG. 6, the one or more line driver processes are represented by line driver processes 630, 631, 632, and 633.

According to an embodiment, line driver processes 630, 631, 632, and 633 are each instances of a line driver class, running in a process, that include program code that provides an implementation of the Send( ) interface and the Crawler( ) interface defined by abstraction layer 610. Each line driver process of line driver processes 630, 631, 632, and 633 are associated with an online service, and each line driver process can interface with an API of the online service. Thus, each line driver process can receive a rule that corresponds to the associated online service from monitoring registration process 620, and can monitor the online service based on the rule. Once each line driver process identifies and selects a message broadcast within the online service based on the rule, each line driver process forwards the message to abstraction layer 610. In addition, upon receiving a response message from abstraction layer 610, one line driver process of line driver processes 630, 631, 632, and 633 transforms the response message into a response message with a format appropriate for the corresponding online service, and broadcasts the formatted response message within the online service.

Furthermore, according to the embodiment, abstraction layer 610 creates and manages one or more agent console processes. In the illustrated embodiment of FIG. 6, the one or more agent console processes are represented by agent console transmission process 640, agent console reception process 650, and agent console URL shortening process 660. In one embodiment, a single process performs the functionality performed by transmission process 640, agent console reception process 650, and agent console URL shortening process 660, where the functionality is described below in greater detail.

According to an embodiment, when a line driver process (such as line driver processes 630, 631, 632, and 633) transmits a message that has been broadcast within an online service to abstraction layer 610, abstraction layer 610 creates agent console transmission process 640 to interface with an agent console, and transmits the message to agent console transmission process 640. Agent console transmission process 640 receives the message, establishes a chat session with the agent console based on a chat protocol that itself is based on an API, and transforms the message into a message with a format appropriate for the chat session with the agent console. Agent console transmission 640 subsequently transmits the formatted message within the chat session to the agent console.

In the embodiment, when the agent console transmits a response message, agent console reception process 650 receives the response message and transmits the response message to abstraction layer 610, where abstraction layer 610 forwards the response message to the appropriate line driver process (i.e., one of line driver processes 630, 631, 632, or 633) for formatting and transmission.

In one embodiment, where the response message includes one or more URLs, the response message is also forwarded to agent console URL shortening process 660. Agent console URL shortening process 660 shortens the one or more URLs within the response message using a URL shortening service. In an embodiment, the URL shortening service is a bit.ly URL shortening service.

Thus, in one embodiment, service dispatcher 600 establishes a bidirectional communication channel between an author of a message broadcast within an online service, and a user of the system that utilizes an agent console of the system, where messages can be transmitted and received. This bidirectional communication is described in greater detail in relation to FIG. 7.

Figure 7:
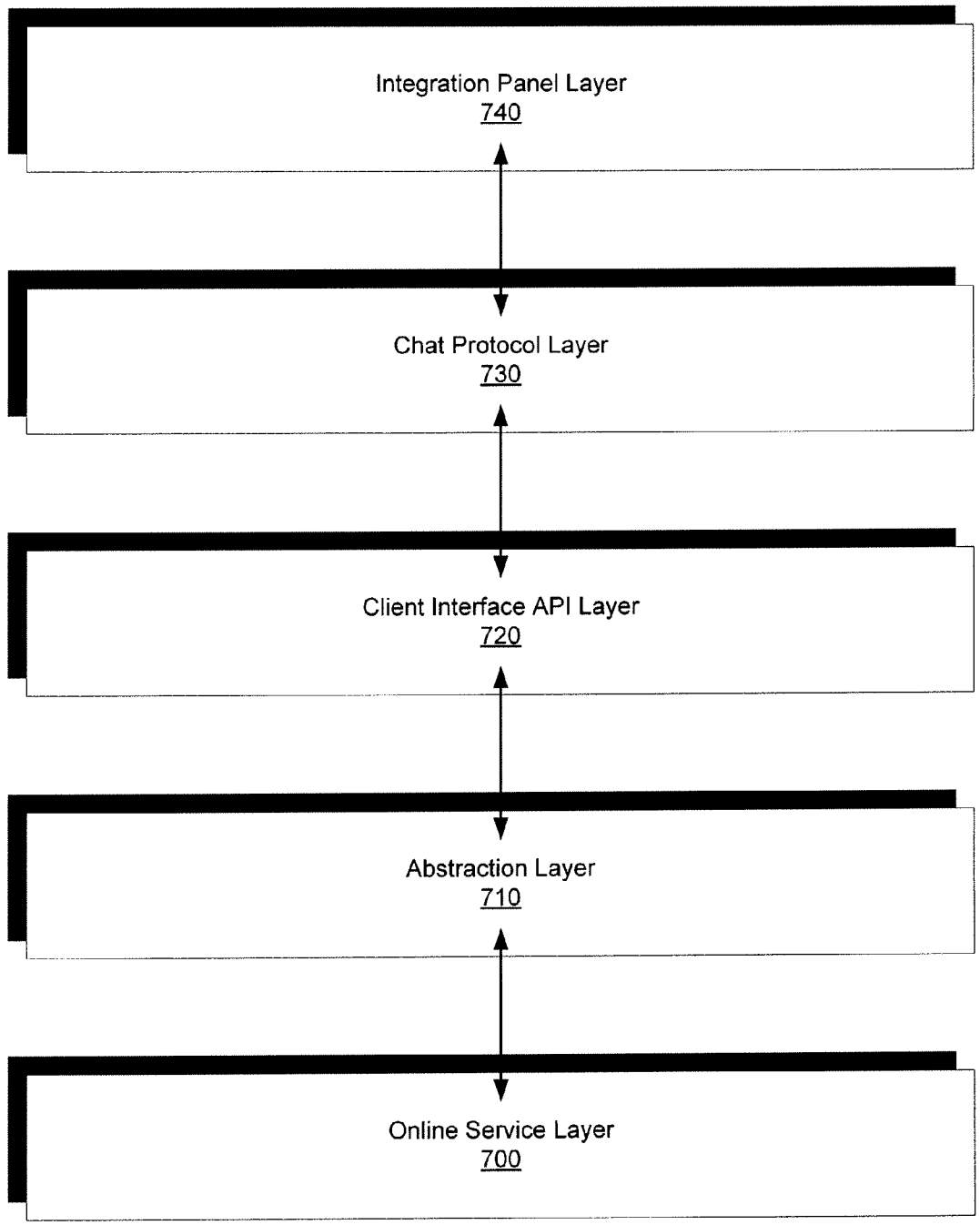
FIG. 7 illustrates a bidirectional communication channel established by a service dispatcher, according to an embodiment of the invention.

FIG. 7 illustrates a bidirectional communication channel established by a service dispatcher, according to an embodiment of the invention. According to the embodiment, messages can pass through one or more layers because of the bidirectional communication channel. In the illustrated embodiment of FIG. 7, there are five layers; online service layer 700, abstract layer 710, client interface API layer 720, chat session layer 730, and integration panel layer 740.

According to an embodiment, online service layer 700 represents an online service that is monitored by the service dispatcher. A message that is broadcast within online service layer 700 can be forwarded to abstract layer 710 using the bidirectional communication channel.

In the embodiment, abstraction layer 710 represents a process that abstracts the implementation details of one or more online services, so that other layers do not require knowledge of the implementation details. In one embodiment, abstraction layer 710 is identical to abstraction layer 610 of FIG. 6. A message that is forwarded to abstraction layer 710 from online service layer 700 can be transformed into a message with a format that is recognizable by abstraction layer 710, so that the message can be understood by other layers. Subsequently, the formatted message can be forwarded to client interface API layer 720 using the bidirectional communication channel.

In the embodiment, client interface API layer 720 represents an API that can be used to create a chat session. The formatted message can be further transformed into a formatted message with a format that is recognizable by chat protocol layer 730. Subsequently, the formatted message can be forwarded to chat protocol layer 730 using the bidirectional communication channel.

In the embodiment, chat protocol layer 730 represents a chat protocol that can be used to create a chat session. The formatted message can be further transformed into a formatted message with a format that is recognizable by integration panel layer 740. Subsequently, the formatted message can be forwarded to integration panel layer 740 using the bidirectional communication channel.

In the embodiment, integration panel layer 740 represents an integration panel, which is a component of an agent console. The formatted message can be displayed to a user within a user interface of the integration panel.

As the communication channel is bidirectional, a user can create a response message within a user interface of the integration panel to an author of the original message broadcast within online service layer 700. According to the embodiment, the response message can be forwarded from integration panel layer 740 to chat protocol layer 730, to client interface API layer 720, to abstraction layer 710, and to online service layer 700, in an order that is reversed from the order previously described. In this embodiment, the response message can be formatted as appropriate. Thus, chat protocol layer 730 can transform the response message into a response message with a format recognizable by client interface API layer 720, client interface API layer 720 can transform the formatted response message into a formatted response message with a format recognizable by abstraction layer 710, and abstraction layer 710 can transform the formatted response message into a formatted response message with a format recognizable by online service layer 700.

In one embodiment, a system can include an agent console (such as agent console 230 of FIG. 2), where the agent console can establish a chat session (such as chat session 240 of FIG. 2). An agent console allows a user of the system to receive the messages broadcast within the online services that are retrieved by a service dispatcher. In one embodiment, the agent console can perform this function by displaying the messages broadcast within the online services in a user interface. The agent console also allows a user of the system to transmit response messages that can be broadcast within the online services by the service dispatcher. In one embodiment, the agent console can perform this function by displaying a chat session within the user interface. The chat session can be established by the service dispatcher, based on a chat protocol, where the chat session can be utilized to transmit messages to and from the agent console.

Figure 8:
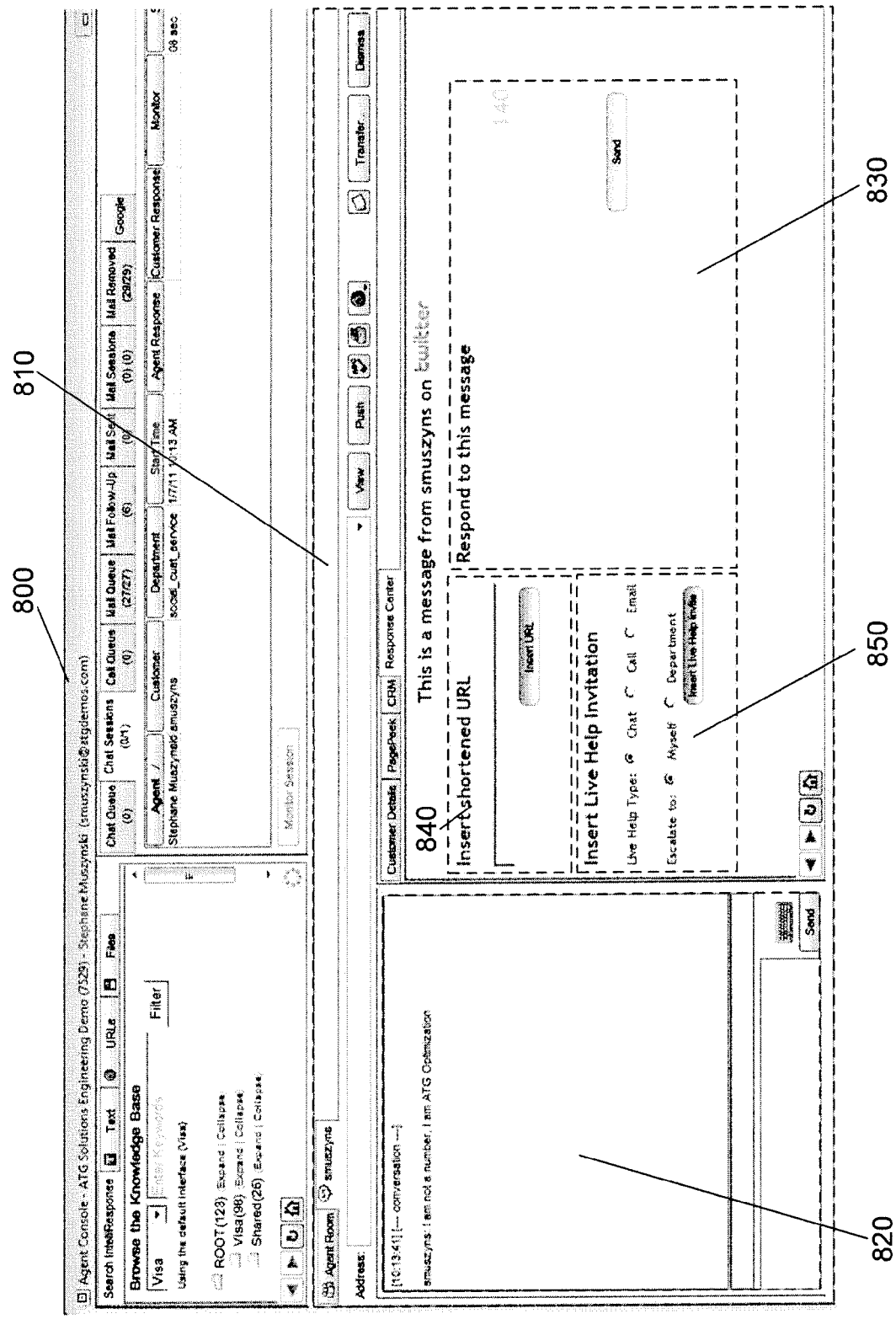
FIG. 8 illustrates a user interface of an agent console that displays messages broadcast within an online service, and displays a chat session that allows a user to transmit response messages, according to an embodiment of the invention.

FIG. 8 illustrates a user interface 800 of an agent console that displays messages broadcast within an online service, and displays a chat session that allows a user to transmit response messages, according to an embodiment of the invention. According to the embodiment, user interface 800 includes integration panel 810. Integration panel 810 is an interface that can be displayed as a tab within user interface 800. Integration panel 810 can display a message that is broadcast within an online service. Furthermore, integration panel 810 can allow a user to transmit a response message to the author of the message within the online service. In addition, integration panel 810 can display information about the author of the message, if information about the author is known. In one embodiment, this information can be used to contact the author through a medium outside of the agent console, such as a telephone communication or Internet chat communication.

Integration panel 810 also includes chat window 820, in accordance with the embodiment. Chat window 820 displays a chat session that has been established, where the message broadcast within the online service is transmitted within the chat session, and displayed within chat window 820. In an embodiment, chat window 820 displays the message broadcast within the online service as an initial message of the displayed chat session. In one embodiment, chat window 820 also displays a handle of the author of the message broadcast within the online service, as the handle is displayed within the online service. According to an embodiment, the chat session is established for a dedicated department that is set as an attribute of the rule that the message is based upon.

In one embodiment, chat window 820 also displays the following data: a handle of the author of the message broadcast within the online service; a name of the online service; a rule identity of the rule that the message is based upon; and the message broadcast within the online service.

In one embodiment, chat window 820 can also transmit a response message to an author of the message broadcast within the online service. Integration panel 810 can be used to create the response message, as is now described in greater detail.

According to the embodiment, integration panel 810 includes text field 830. Text field 830 allows a user to enter text for a response message. As the text is entered, the text is displayed within text field 830. In the embodiment, the text can be inserted into the response message that is transmitted to an author of the message displayed within integration panel 810. According to the embodiment, text field 830 can also display a numeric value. The numeric value serves as a counter that can be established depending on whether a character limitation exists for the corresponding online service.

Integration panel 810 also includes URL shortening field 840, in accordance with the embodiment. URL shortening field 840 allows a user to enter a URL for a response message. The URL is then shortened using a URL shortening service, such as the bit.ly URL shortening service. The shortened URL is then inserted into text field 830, as part of the text that is eventually inserted into the response message.

According to the embodiment, integration panel 810 also includes escalation field 850. Escalation field 850 can be used when the user wishes to establish an external communication between the author of the message broadcast within the online service and either the user, or a different department. Examples of external communications include an Internet chat communication, a telephone communication, and an email communication. In the embodiment, if the user wishes to establish an external communication with an author of a message broadcast within an online service, the user can select a communication type within escalation field 850. This can cause a URL to be inserted into the response message that is transmitted to an author of the message displayed within integration panel 810. The URL can be a link that establishes an Internet chat communication, a link that establishes a telephone communication, a link that establishes an email communication, or a link that establishes another type of communication, depending on the communication type selected. In an embodiment, when the author of the message accesses the URL, integration panel 810 can receive the following data: a handle of the author of the message; an indication that an external communication is requested; an online service name; an identity of the user who originally responded to the message; a user name of the user who originally responded to the message, an incident number associated with the message; and the message.

Furthermore, according to the embodiment, the user can determine whether the URL that establishes an external communication should be routed to the user, or routed to a different department, by selecting a destination type within escalation field 850. The URL is then inserted into text field 830, as part of the text that is eventually inserted into the response message. In one embodiment, in addition to inserting the URL into the response message, a timestamp is also inserted into the response message. This effectively allows the URL to expire if the URL is not accessed within a predefined time duration subsequent to the timestamp.

According to the embodiment, once a user has created a response message using text field 830, URL shortening field 840, escalation field 850, or a combination therein, a user can click on a send button displayed within integration panel 810 using a cursor control device, such as a computer mouse. Upon the user clicking on the send button displayed within integration panel 810, the response message is displayed within chat window 820. Once the response message is displayed within chat window 820, a user can click on a send button displayed within chat window 820. Upon the user clicking on the send button displayed within chat window 820, the response message is transmitted to a service dispatcher by the agent console, where the service dispatcher transmits the response message with the online service to the author of the original message, as previously described.

Figure 9:
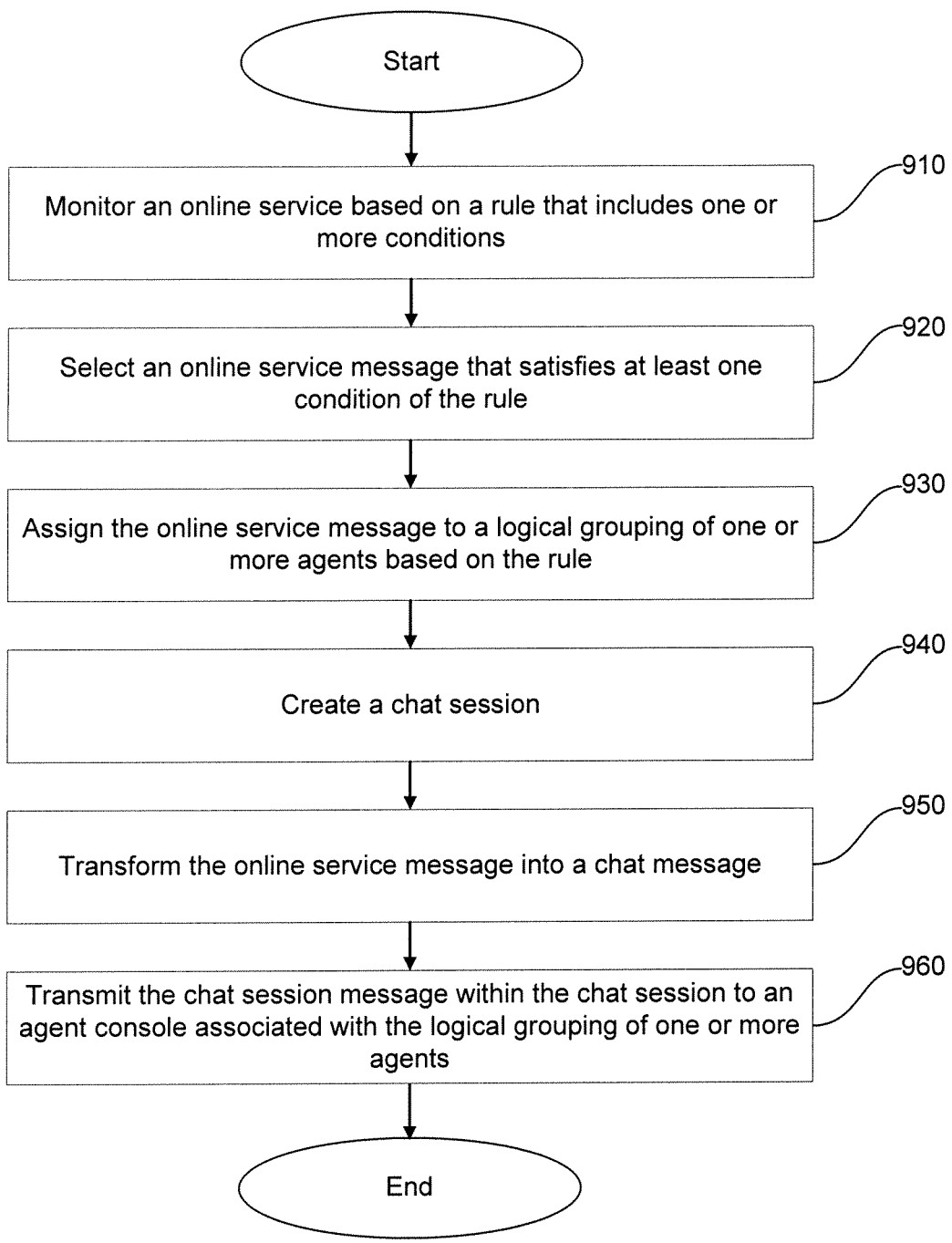
FIG. 9 illustrates a flow diagram of the functionality of an online service monitoring module according to an embodiment of the invention.

FIG. 9 illustrates a flow diagram of the functionality of an online service monitoring module according to an embodiment of the invention. In one embodiment, the functionality of the flow diagram of FIG. 9 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 910, an online service is monitored based on a rule that includes one or more conditions. In one embodiment, the rule is defined by a rules engine and stored within a database. According to an embodiment, the one or more conditions are keyword conditions. In an alternate embodiment, the one or more conditions are sentiment conditions. In yet another alternate embodiment, the one or more conditions are a combination of keyword conditions and sentiment conditions. In one embodiment, the online service is a social networking service. In an alternate embodiment, the online service is a text messaging service. In yet another embodiment, the online service is an instant messaging service. In one embodiment, a line driver process, that is created by an abstraction layer, performs the monitoring of the online service, while a monitoring registration process, also created by the abstraction layer, receives a provisioning message that includes the rule.

At 920, an online service message that has been broadcast within the online service, and that satisfies at least one condition of the rule, is selected. In one embodiment, the business logic of the at least one condition defines which online service messages broadcast within the online service are to be identified and selected. In an embodiment where the at least one condition is a keyword condition, an online service message that includes text that satisfies the at least one keyword condition is selected. In an embodiment where the at least one condition is a sentiment condition, an online service message that includes text that satisfies the at least one sentiment condition is selected. In an embodiment, the line driver process, created by the abstraction layer, performs the selection of the online service message.

At 930, the online service message is assigned to a logical grouping of one or more agents based on the rule. In one embodiment, an agent within the logical grouping of one or more agents manually selects the online service message. In an alternate embodiment, the online service message is automatically assigned to an agent within the logical grouping of one or more agents.

At 940, a chat session is created. In one embodiment, the chat session is created based on a chat protocol. According to the embodiment, the chat session is displayed within a chat window that is displayed within a user interface of an agent console. In an embodiment, the abstraction layer creates the chat session.

At 950, the online service message is transformed into a chat session message. In one embodiment, this transformation includes transforming a format of the online service message into a format that is appropriate for the chat session. In an embodiment, the abstraction layer transforms the chat session message.

At 960, the chat session message is transmitted within the chat session to an agent console associated with the logical grouping of one or more agents. In one embodiment, the chat session message is displayed within a chat window that is displayed within a user interface of the agent console. In an embodiment, an agent console transmission process, created by the abstraction layer, transmits the chat session message within the chat session to the agent console.

In one embodiment, a second chat message is received within the chat session. This second chat message can be created at the agent console. In an embodiment, an agent console reception process, created by the abstraction layer, receives the second chat message within the chat session. The second chat message is then transformed into a second online service message. In one embodiment, this transformation includes transforming a format of the second chat message into a format that is appropriate for the online service. In an embodiment, a line driver process, created by the abstraction layer, transforms the second chat message into the second online service message. The second online service message is then broadcast within the online service. In an embodiment, the line driver process, created by the abstraction layer, broadcasts the second online service message within the online service.

In accordance with an embodiment, a computer-readable medium, computer-implemented method, and system is provided for automatically monitoring online services and responding to messages broadcast within the online services. Thus, according to the embodiment, users of the system, such as call center agents, do not need to be trained regarding the specific implementation details of various online services, such as social networking services. Rather, the process of monitoring online services is automated, and users of the system can focus on providing substantive responses to vocal dissatisfied customers. Additionally, the system can target specific messages based on rules, and users of the system can avoid wading through a staggering amount of irrelevant noise broadcast within the online services. By giving control of how the rules are defined to administrators of the system, a systematic monitoring strategy can be applied, rather than various ad-hoc monitoring techniques performed at the user level. Furthermore, the system can be updated for new online services, without changing how the users interact with the system. This allows the system to scale as new online services are created, and an increasing number of messages are monitored. Finally, the system can leverage a chat session platform, and thus, provide a streamlined, controlled, and efficient response mechanism to messages broadcast within the online services.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to monitor, and respond to, one or more online service messages, the monitoring and responding comprising:

monitoring an online service based on a rule that comprises one or more conditions and one or more attributes, wherein a condition comprises business logic that defines which online service messages broadcast within the online service include text that satisfy a criteria and are to be selected, and wherein the one or more attributes comprises a logical grouping attribute that defines a routing configuration for online service messages broadcast within the online service that are selected based on the rule, and a search time attribute that defines a time duration that the online service is monitored;

selecting an online service message that has been broadcast within the online service that satisfies at least one condition of the rule and that satisfies the search time attribute;

assigning the online service message to a logical grouping of one or more agents based on the logical grouping attribute of the rule;

creating a chat session;

transforming the online service message into a chat session message;

selecting an agent console associated with the logical grouping of one or more agents using the routing configuration;

transmitting the chat session message within the chat session to the selected agent console;

inserting a uniform resource locator within a response message, wherein the uniform resource locator establishes an external communication between an author of the online service message and an agent of the selected agent console; and transmitting the response message within the chat session to the author of the online service message.

2. The non-transitory computer-readable medium of claim 1, wherein the monitoring and responding further comprise automatically assigning the online service message to an agent within the logical grouping of the one or more agents.

3. The non-transitory computer-readable medium of claim 1, wherein the rule is defined by a rule engine and stored within a database.

4. The non-transitory computer-readable medium of claim 1, wherein an abstraction layer abstracts implementation details of the online service; and wherein the abstraction layer creates a line driver process that receives the rule and monitors the online service based on the rule.

5. The non-transitory computer-readable medium of claim 4, wherein the abstraction layer creates a monitoring registration process that receives a provisioning message that comprises the rule;

wherein the abstraction layer creates an agent console transmission process that transmits the online service message to the selected agent console; and wherein the abstraction layer creates an agent console reception process that receives the response message from the selected agent console.

6. The non-transitory computer-readable medium of claim 1, wherein the chat session is created based on a chat protocol; and wherein the chat session is displayed within a chat window that is displayed within a user interface of the selected agent console.

7. The non-transitory computer-readable medium of claim 1, wherein the online service comprises one of: a social networking service; a text messaging service; or an instant messaging service.

8. The non-transitory computer-readable medium of claim 1, wherein the response message is further configured to be transmitted to the author of the online service message using a bidirectional communication channel that is established between the author of the online service message and the agent console.

9. The non-transitory computer-readable medium of claim 1, wherein the response message is transmitted within the chat session to the author of the online service message using a bidirectional communication channel that is established between the author of the online service message and the agent console.

10. A computer-implemented method for monitoring, and responding to, one or more online service messages, the computer-implemented method comprising:
monitoring an online service based on a rule that comprises one or more conditions and one or more attributes, wherein a condition comprises business logic that defines which online service messages broadcast within the online service include text that satisfy a criteria and are to be selected, and wherein the one or more attributes comprises a logical grouping attribute that defines a routing configuration for online service messages broadcast within the online service that are selected based on the rule, and a search time attribute that defines a time duration that the online service is monitored;
selecting an online service message that has been broadcast within the online service that satisfies at least one condition of the rule and that satisfies the search time attribute;
assigning the online service message to a logical grouping of one or more agents based on the logical grouping attribute of the rule;
creating a chat session;
transforming the online service message into a chat session message;
selecting an agent console associated with the logical grouping of one or more agents using the routing configuration;
transmitting the chat session message within the chat session to the selected agent console;
inserting a uniform resource locator within a response message, wherein the uniform resource locator establishes an external communication between an author of the online service message and an agent of the selected agent console; and
transmitting the response message within the chat session to the author of the online service message.

11. The computer-implemented method of claim 10, further comprising automatically assigning the online service message to an agent within the logical grouping of the one or more agents.

12. The computer-implemented method of claim 10, wherein the rule is defined by a rule engine and stored within a database.

13. The computer-implemented method of claim 10, wherein an abstraction layer abstracts implementation details of the online service; and
wherein the abstraction layer creates a line driver process that receives the rule and monitors the online service based on the rule.

14. The computer-implemented method of claim 13, wherein the abstraction layer creates a monitoring registration process that receives a provisioning message that comprises the rule;
wherein the abstraction layer creates an agent console transmission process that transmits the online service message to the selected agent console; and
wherein the abstraction layer creates an agent console reception process that receives the response message from the selected agent console.

15. The computer-implemented method of claim 10, wherein the chat session is created based on a chat protocol; and
wherein the chat session is displayed within a chat window that is displayed within a user interface of the selected agent console.

16. The computer-implemented method of claim 10, wherein the online service comprises one of: a social networking service; a text messaging service; or an instant messaging service.

17. A system, comprising:
a processor that executes instructions;
an online service monitor that monitors an online service based on a rule that comprises one or more conditions and one or more attributes, wherein a condition comprises business logic that defines which online service messages broadcast within the online service include text that satisfy a criteria and are to be selected, and wherein the one or more attributes comprises a logical grouping attribute that defines a routing configuration for online services message broadcast within the online service that are selected based on the rule, and a search time attribute that defines a time duration that an online service is monitored;
an online service message selector that selects an online service message that has been broadcast within the online service that satisfies at least one condition of the rule and that satisfies the search time attribute;
an online service message assignor that assigns the online service message to a logical grouping of one or more agents based on the logical grouping attribute of the rule;
a chat session creator that creates a chat session;
an online service message transformer that transforms the online service message into a chat session message;
an agent console selector that selects an agent console associated with the logical grouping of one or more agents using the routing configuration;
a chat session message transmitter that transmits the chat session message within the chat session to the selected agent console;
a response message creator that inserts a uniform resource locator within a response message, wherein the uniform resource locator establishes an external communication between an author of the online service message and an agent of the selected agent console; and
a response message transmitter that transmits the response message within the chat session to the author of the online service message.

18. The system of claim 17, wherein the online service message assignor automatically assigns the online service message to an agent within the logical grouping of the one or more agents.

19. The system of claim 17, further comprising a rule engine;
wherein the rule is defined by the rule engine and stored within a database.

20. The system of claim 17, further comprising an abstraction layer and a line driver process;
wherein the abstraction layer abstracts implementation details of the online service; and
wherein the abstraction layer creates the line driver process that receives the rule and monitors the online service based on the rule.

21. The system of claim 20, further comprising a monitoring registration process, an agent console transmission process, and an agent console reception process;

wherein the abstraction layer creates the monitoring registration process that receives a provisioning message that comprises the rule;

wherein the abstraction layer creates the agent console transmission process that transmits the online service message to the selected agent console; and wherein the abstraction layer creates the agent console reception process that receives the response message from the selected agent console.

22. The system of claim 17, wherein the chat session creator creates the chat session based on a chat protocol; and wherein the chat session creator displays the chat session within a chat window that is displayed within a user interface of the selected agent console.

* * * * *